(12) United States Patent
Sundararajan et al.

(10) Patent No.: US 12,549,597 B2
(45) Date of Patent: Feb. 10, 2026

(54) SECURITY TELEMETRY FROM NON-ENTERPRISE PROVIDERS TO SHUTDOWN COMPROMISED SOFTWARE DEFINED WIDE AREA NETWORK SITES

(71) Applicant: Cisco Technology, Inc., San Jose, CA (US)

(72) Inventors: Balaji Sundararajan, Fremont, CA (US); Vivek Agarwal, Campbell, CA (US); Vishnuprasad Raghavan, Sammamish, WA (US); Kannan Kumar, Tracy, CA (US); Chandra Balaji Rajaram, Tracey, CA (US)

(73) Assignee: Cisco Technology, Inc., San Jose, CA (US)

(*) Notice: Subject to any disclaimer, the term of this patent is extended or adjusted under 35 U.S.C. 154(b) by 325 days.

(21) Appl. No.: 18/106,891

(22) Filed: Feb. 7, 2023

(65) Prior Publication Data
US 2024/0106855 A1   Mar. 28, 2024

Related U.S. Application Data

(60) Provisional application No. 63/410,841, filed on Sep. 28, 2022.

(51) Int. Cl.
*H04L 9/40* (2022.01)

(52) U.S. Cl.
CPC ...... *H04L 63/1466* (2013.01); *H04L 63/0227* (2013.01)

(58) Field of Classification Search
CPC ............ H04L 63/1466; H04L 63/0227
See application file for complete search history.

(56) References Cited

U.S. PATENT DOCUMENTS

| | | | |
|---|---|---|---|
| 9,325,734 B1* | 4/2016 | Peacock | G06F 40/14 |
| 9,456,001 B2* | 9/2016 | Bhatt | G06F 21/554 |
| 10,068,089 B1* | 9/2018 | Shavell | H04W 12/12 |
| 11,252,188 B1* | 2/2022 | Lantuh | H04L 63/1466 |
| 2019/0373018 A1* | 12/2019 | Yang | G06F 21/54 |
| 2020/0153855 A1 | 5/2020 | Kirti | |
| 2020/0177606 A1 | 6/2020 | Valluri | |
| 2022/0053019 A1* | 2/2022 | Lantuh | H04L 63/1466 |
| 2022/0070209 A1* | 3/2022 | Lantuh | H04L 63/029 |
| 2022/0070222 A1 | 3/2022 | Hosur | |
| 2022/0103592 A1 | 3/2022 | Semel | |
| 2022/0210173 A1 | 6/2022 | Katmor | |
| 2022/0279014 A1* | 9/2022 | Stokes, III | G06F 21/56 |
| 2024/0275707 A1* | 8/2024 | Slutckii | H04L 43/062 |

* cited by examiner

*Primary Examiner* — Yonas A Bayou
(74) *Attorney, Agent, or Firm* — Lee & Hayes, P.C.

(57) ABSTRACT

This disclosure describes techniques and mechanisms for improving security within SDWAN fabric and utilizing telemetry data from non-enterprise providers to remediate compromised SDWAN site(s) and/or user(s). The techniques may implement an integration of non-enterprise application(s) and API(s) with an enterprise network, thereby enabling the enterprise network to identify compromised endpoint(s), identify user(s), group(s), site(s) that are impacted, and take a corrective action (by the enterprise network and/or the non-enterprise application(s) or API(s)) on the enterprise fabric.

20 Claims, 5 Drawing Sheets

300

| Control Plane | Telemetry Data | |
|---|---|---|
| Site 100-- 100.1.1.1 System IP | OS 1 | OS 2 |
| User IP Address | 100.1.1.2 | 100.1.1.15 |
| Firewall Installation Checks | ✓ | ✗ |
| Application Inventory | ✓ | ✓ |
| Hardware Inventory | ✗ | ✓ |
| Process Checks | ✓ | ✓ |
| Dictionary Conditions | ✓ | ✗ |
| Application Checks | ✓ | ✓ |
| File Checks | ✓ | ✓ |
| Service Checks | ✓ | ✓ |
| Disk Encryption | ✓ | ✓ |
| Patch Management | ✓ | ✓ |
| Registry Checks | ✓ | N/A |
| USB Checks | ✓ | ✗ |
| WSUS Remediation (legacy) | ✓ | N/A |
| Remediation | Auto, Manual | Partial |
| Anti-Malware Checks | ✓ | ✓ |

FIG. 3

SECURITY TELEMETRY FROM NON-ENTERPRISE PROVIDERS TO SHUTDOWN COMPROMISED SOFTWARE DEFINED WIDE AREA NETWORK SITES

CROSS REFERENCE TO RELATED APPLICATIONS

This application claims priority to U.S. Provisional Patent Application No. 63/410,841, filed on Sep. 28, 2022, the entire contents of which are incorporated herein by reference

TECHNICAL FIELD

The present disclosure relates generally to the field of computer networking, and more particularly to improving security within SDWAN fabric and utilizing telemetry data from non-enterprise providers to remediate compromised SDWAN site(s) and/or user(s).

BACKGROUND

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Threat and compliance data provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

One example network is an enterprise network that utilizes a software defined wide area network (SDWAN) fabric. Within the enterprise network, users may utilize various applications that may detect viruses or other security issues. For instance, a user may register and/or use Microsoft Defender on an end point device within the enterprise network. While current techniques enable the application to identify various threats and/or vulnerabilities within the application and/or user device, the application itself is currently unable to take remedial action at a network level. Moreover, the enterprise network currently does not have access to data indicating when a threat and/or vulnerability of the device and/or network is detected by the application. Accordingly, this results in inefficiencies within the enterprise network and may result in security vulnerabilities within the network.

Accordingly, there is a need for an integrated mechanism that can identify compromised endpoints within a network and take corrective action.

BRIEF DESCRIPTION OF THE DRAWINGS

The detailed description is set forth below with reference to the accompanying figures. In the figures, the left-most digit(s) of a reference number identifies the figure in which the reference number first appears. The use of the same reference numbers in different figures indicates similar or identical items. The systems depicted in the accompanying figures are not to scale and components within the figures may be depicted not to scale with each other.

FIG. 3 an example user interface a data packet that is generated by the system described in FIG. 1.

DESCRIPTION OF EXAMPLE EMBODIMENTS

Overview

Figure 1:
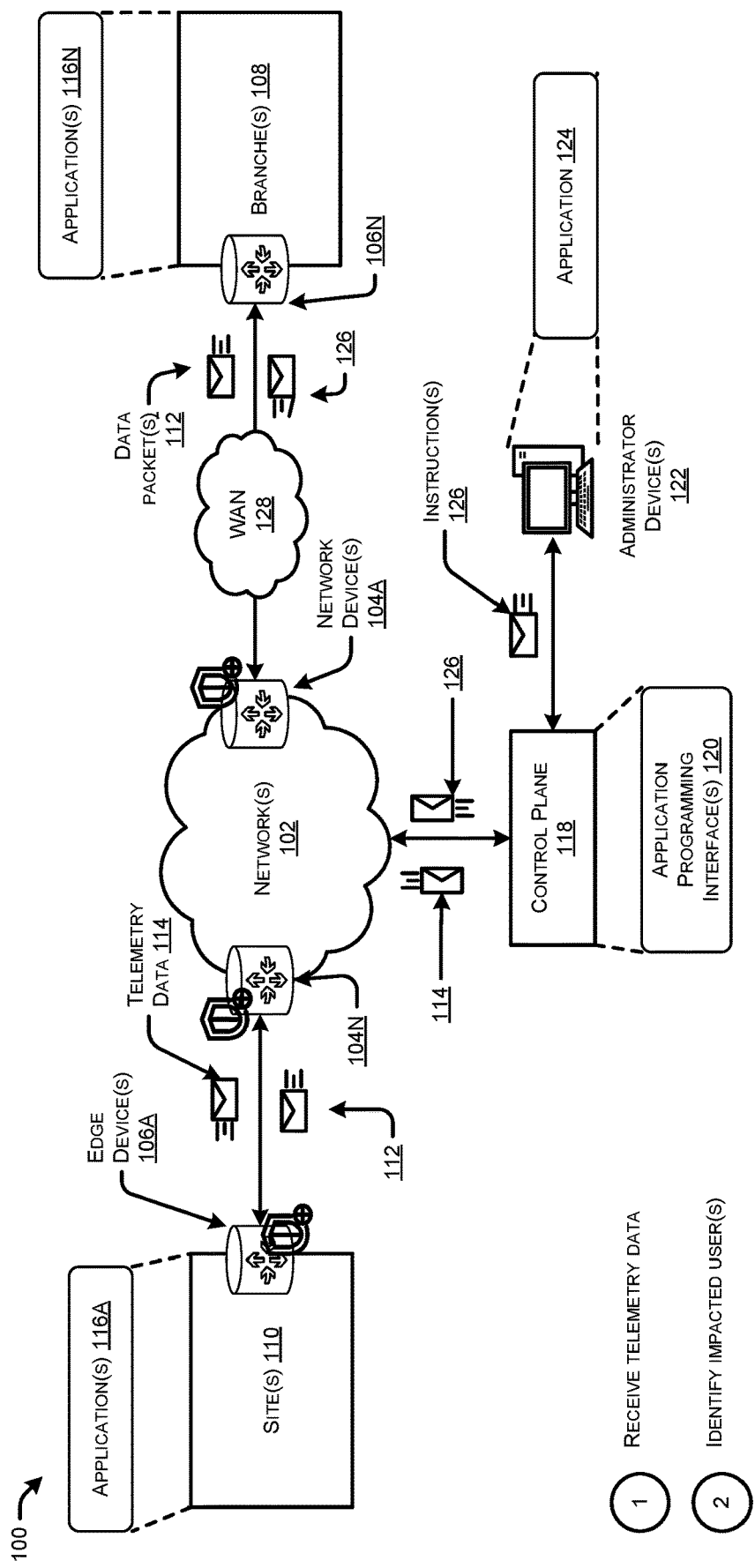
FIG. 1 illustrates a system-architecture diagram of an environment in which a system can improve security within a SDWAN network.

The present disclosure relates generally to the field of computer networking, and more particularly to improving security within SDWAN networks.

A method to perform the techniques described herein may include receiving, via an enterprise network and from an application running on an endpoint device within the enterprise network, telemetry data. In some examples, the method may include identifying, based at least in part on the telemetry data, one or more impacted users. In some examples, the method may include determining, based at least in part on the identifying, one or more groups associated with the one or more impacted users. The method may include identifying a security policy associated with the one or more groups or one or more impacted users. Additionally, the method may include apply a remedial action to the one or more groups or the one or more impacted users.

Additionally, any techniques described herein, may be performed by a system and/or device having non-transitory computer-readable media storing computer-executable instructions that, when executed by one or more processors, performs the method(s) described above and/or one or more non-transitory computer-readable media storing computer-readable instructions that, when executed by one or more processors, cause the one or more processors to perform the method(s) described herein.

EXAMPLE EMBODIMENTS

Computer networks are generally a group of computers or other devices that are communicatively connected and use one or more communication protocols to exchange data, such as by using packet switching. For instance, computer networking can refer to connected computing devices (such as laptops, desktops, servers, smartphones, and tablets) as well as an ever-expanding array of Internet-of-Things (IoT) devices (such as cameras, door locks, doorbells, refrigerators, audio/visual systems, thermostats, and various sensors) that communicate with one another. Modern-day networks deliver various types of networks, such as Local-Area Networks (LANs) that are in one physical location such as a building, Wide-Area Networks (WANs) that extend over a large geographic area to connect individual users or LANs, Enterprise Networks that are built for a large organization, Internet Service Provider (ISP) Networks that operate WANs to provide connectivity to individual users or enterprises, software-defined networks (SDNs), wireless networks, core networks, cloud networks, and so forth.

These networks often include specialized network devices to communicate packets representing various data from device-to-device, such as switches, routers, servers, access points, and so forth. Each of these devices is designed and configured to perform different networking functions. For instance, switches act as controllers that allow devices in a network to communicate with each other. Routers connect multiple networks together, and also connect computers on those networks to the Internet, by acting as a dispatcher in networks by analyzing data being sent across a network and choosing an optimal route for the data to travel. Access points act like amplifiers for a network and serve to extend the bandwidth provided by routers so that the network can support many devices located further distances from each other.

One example network is an enterprise network that utilizes a software defined wide area network (SDWAN) fabric. Within the enterprise network, users may utilize various applications that may detect viruses or other security issues. For instance, a user may register and/or use Microsoft Defender on an end point device within the enterprise network. While current techniques enable the application to identify various threats and/or vulnerabilities within the application and/or user device, the application itself is currently unable to take remedial action at a network level. Moreover, the enterprise network currently does not have access to data indicating when a threat and/or vulnerability of the device and/or network is detected by the application. Accordingly, this results in inefficiencies within the enterprise network and may result in security vulnerabilities within the network.

Accordingly, there is a need for an integrated mechanism that can identify compromised endpoints within a network and take corrective action This disclosure describes techniques and mechanisms for a control plane to identify compromised end point(s) utilizing data from a non-enterprise product, identify user(s), group(s), and/or application(s) that are impacted, and take corrective action on an enterprise fabric. In some examples, the system may receive, via an enterprise network and from an application running on an endpoint device within the enterprise network, telemetry data. In some examples, the system may identify, based at least in part on the telemetry data, one or more impacted users. In some examples, the system may determine, based at least in part on the identifying, one or more groups associated with the one or more impacted users. The system may identify a security policy associated with the one or more groups or one or more impacted users. Additionally, the system may apply a remedial action to the one or more groups or the one or more impacted users.

In some examples, the remedial action(s) comprise quarantining (e.g., providing limited access to the user, isolating the user's VRF and/or moving the user to a quarantine VRF) the user and/or endpoint device. In this example, the system may perform a posture assessment (e.g., check Hotfix, AV, Pin lock USB device, unauthorized applications, malware, trojan, etc.) and may identify one or more remediation actions (e.g., WSUS, re-launching the application, launching and/or re-launching scripts, MDM, etc.) to perform to correct the security violation.

In some examples, the remedial action(s) comprise moving one or more endpoint device(s) to staging mode (e.g., for an entire site, preventing traffic from accessing or leaving the site, instead of shutting down just the compromised endpoint device and/or application). In some examples, the system may notify an administrator of the enterprise network via the control plane.

In some examples, the system may perform a posture assessment (e.g., check Hotfix, AV, Pin lock USB device, unauthorized applications, malware, trojan, etc.) and may identify one or more remediation actions (e.g., WSUS, re-launching the application, launching and/or re-launching scripts, MDM, etc.) to perform to correct the security violation.

In some examples, the system may authorize an application on the endpoint device(s) to perform the remediation (e.g., by following AD or SGT Tag assignment). For instance, the system may receiving an indication via the control plane that the administrator of the enterprise network authorizes an endpoint device to perform action(s) to fix a compromised sit and/or endpoint device.

In some examples, the system may track flow information (e.g., such as last accessed flow information) associated with the site via DPI flows. The system may determine that the security violation has been fixed (e.g., based on additional data received by the control plane and/or the flow information), such as by determining the security posture of the endpoint device is compliant with the security policy and/or firewall. For instance, the system may determine that a malicious application is not present in an AAR based on flow tracking at destination site(s).

In some examples, the system may authorize or re-authorize the endpoint device to have access to the enterprise network (e.g., such as moving the user back to the corporate VPN, assigning SGT tag(s), updating AAR policy, updating firewall policy, updating a site for all user(s), updating path and user flows, etc.).

In some examples, the system may comprise one or more application programming interface(s) (API(s)). In some examples, the APIs may correspond to non-enterprise network applications. For example, where the enterprise network corresponds to Cisco's network, the API(s) may corresponds to Microsoft API(s) that enable the system to receive telemetry data indicating threat(s) and/or vulnerabilities identified by a Microsoft Application associated with an endpoint device (e.g., such as from Microsoft's Defender).

In some examples, the telemetry data comprise indications of feedback from a non-enterprise application. For instance, where the non-enterprise application comprises Microsoft's Defender, the telemetry data may comprise indications of compliance with security posture(s) and/or firewall(s) including an anti-malware status, anti-spyware status, anti-virus status, application health data, non-corporate application data, disk encryption check data, file status, patch management data, registry updates data, service updates data, USB insertion data, etc. Additionally, the telemetry data may comprise an indication of a security level of the compromised endpoint device and/or application. In some examples, the security level may be indicated by a score provided to the system by a Microsoft API. In some examples, the API(s) enable the system to access additional data associated with the device(s) within the enterprise network. The additional data may comprise identifying information (e.g., device IP addresses, operating system information, domain information, application flow information, application information, and/or any other information the API has access to.

Accordingly, the system may identify Security posture exposure using the control plane (e.g., such as SGTs via Cisco's vSmart) and may redistribute services and/or instructions to other sites within the enterprise network. For instance, based on the SGTs identified, the system may enable endpoint devices with compromised sites to use a local firewall to enforce L4 to L7 policy to block particular users and/or applications, or quarantine particular user(s) and/or application(s). In some examples, such as where the score provided by the API is high (e.g., indicating the security posture score is bad score), the system may send instructions to move a particular device to staging mode. In this way, the system may utilize integrated information previously unavailable to enterprise networks to disable specific, affected endpoint devices, specific application(s) on endpoint device(s) at a user level and/or a group of user(s) and/or endpoint device(s) at a site level.

In some examples, the system may be configured to isolate remote servers which have been accessed by an infected host recently. DPI logs and connection events from security inspection can be analyzed to identify a list of remote servers accessed by an identified infected device and access control can be enforced for the remote servers, until their security status can be evaluated.

In some examples, the system may comprise a security policy module. In some examples, the security policy module may comprise firewall policies that may be written using security group tags (SGTs) and user-groups as source filters. In some examples, the system may leverage this to provide a dynamic security policy when integrated with data from a non-enterprise application (e.g., such as Microsoft Defender) about user compliance and behavior. In some examples, a firewall policy may create user-groups based on SGTs called non-compliant-users and compromised-endpoints. An example firewall policy may include:

| Source | Destination | Action |
| --- | --- | --- |
| Compromised-endpoints | Any | Drop |
| Non-compliant-users | Secure-servers, SaaS applications | Drop |
| Any | SaaS applications, Secure-servers | Inspect |

In some examples, the security policy module may be configured to determine when a user of an endpoint device takes an action that is non-compliant with a security policy and/or firewall policy. For example, the system may identify when a user's device is identified to be non-compliant with an organization's security posture (e.g., such as a Firewall is not enabled on the laptop). In this example, the system may notify the control plane. In some examples, the system can add the user, user device, application, etc. to a user-group or a pre-configured SGT which identifies the user as non-compliant. This user-IP or SGT-IP mapping may then be propagated to the branch router (via existing ISE integration from the control plane). In some examples, such as wherein the policy is already available on the site and/or branch router, the action for the non-compliant user will be automatically enforced when the next session is initiated from this user (e.g., traffic to known secure servers will be dropped and some SaaS applications can't be accessed by this user).

In some examples, the security policy module may be configured to identify when a user of an endpoint device takes an action that compromises the endpoint device. For example, a user may upload a file that is identified by the API and/or application(s) as malicious. In this example, the application and/or API (e.g., such as Microsoft Defender for Office365 (say user emails this file using Outlook or uploads it to Onedrive) may automatically block the file. Alternatively, the system may retrospectively identity that a file uploaded by a user is infected with a malware. In this example, the control plane (e.g., vManage/vSmart) may be notified. In this example, the system may add the user to a pre-configured group (e.g. of compromised-endpoints) for which a drop-all firewall policy has already been configured on the branch router. In this example, the User-IP/SGT-IP mapping may be pushed to the branch router, which will trigger the enforcement of the policy to drop all traffic from the compromised device. Further, the system may notify the administrator of the network, via the control plane and may enable the administrator to initiate decommissioning the device or a sanitization and re-onboarding of the device.

In some examples, the system may comprise a data plane module. In some examples, the data plane module is configured to handle data packets and data packet flow. In some examples, the data plane module may be configured to track applications and/or application flows, users, and/or AAR via WAN to identify locations affected and/or compromised in overlay fabrics. In some examples, the control plane module may be configured to integrate security information and event management (STEM) and extended detection and response (XDR) to enterprises infrastructure.

In this way, the system may identify compromised endpoint(s), using data from a non-enterprise product, identify user(s), group(s), application(s) that are impacted, and take corrective action on an enterprise fabric. Accordingly, the techniques may integrate application services to streamline and improve security within the enterprise network.

Certain implementations and embodiments of the disclosure will now be described more fully below with reference to the accompanying figures, in which various aspects are shown. However, the various aspects may be implemented in many different forms and should not be construed as limited to the implementations set forth herein. The disclosure encompasses variations of the embodiments, as described herein. Like numbers refer to like elements throughout.

FIG. 1 illustrates a system-architecture diagram of an environment in which a system 100 can improve security within SDWAN networks. While the system 100 shows an example control plane 118, it is understood that any of the components of the system may be implemented on any device in the network 102.

In some examples, the system 100 may include a network 102 that includes network devices 104. The network 102 may include one or more networks implemented by any viable communication technology, such as wired and/or wireless modalities and/or technologies. The network 102 may include any combination of Personal Area Networks (PANs), SDCI, Local Area Networks (LANs), Campus Area Networks (CANs), Metropolitan Area Networks (MANs), extranets, intranets, the Internet, short-range wireless communication networks (e.g., ZigBee, Bluetooth, etc.), Wide Area Networks (WANs)—both centralized and/or distributed—and/or any combination, permutation, and/or aggregation thereof. The network 102 may include devices, virtual resources, or other nodes that relay packets from one network segment to another by nodes in the computer network. The network 102 may include multiple devices that utilize the network layer (and/or session layer, transport layer, etc.) in the OSI model for packet forwarding, and/or other layers.

The system 100 may comprise a control plane 118. In some examples, the control plane 118 corresponds to a system that has complete visibility into the security fabric of a given network (e.g., enterprise network, smaller network, etc. In some examples, the control plane 118 may comprise a controller, one or more processors, etc. In some examples, the control plane 118 may be integrated as part of Cisco's vSmart feature, Cisco's vManage feature, and/or included in a SDWAN architecture.

The control plane 118 may be configured to communicate with one or more network device(s) 104. For instance, as noted above the control plane 118 may receive network data (e.g., network traffic load data, network client data, etc.) or other data (e.g., application load data, data associated with WLCs, APs, etc.) from the network device(s) 104. The network device(s) 104 may comprise routers, switches, access points, stations, radios, or any other network device. In some examples, the network device(s) 104 may monitor traffic flow(s) within the network and may report information associated with the traffic flow(s) to the control plane 118.

In some examples, the control plane is configured to receive telemetry data 114 from application(s) 116 on the network device(s) 104. In some examples, the telemetry data 114 comprise indications of feedback from a non-enterprise application. For instance, where the non-enterprise application comprises Microsoft's Defender, the telemetry data may comprise indications of compliance with security posture(s) and/or firewall(s) including an anti-malware status, anti-spyware status, anti-virus status, application health data, non-corporate application data, disk encryption check data, file status, patch management data, registry updates data, service updates data, USB insertion data, etc. Additionally, the telemetry data may comprise an indication of a security level of the compromised endpoint device and/or application. In some examples, the security level may be indicated by a score provided to the system by a Microsoft API. In some examples, the API(s) enable the system to access additional data associated with the device(s) within the enterprise network. The additional data may comprise identifying information (e.g., device IP addresses, operating system information, domain information, application flow information, application information, and/or any other information the API has access to. In some examples, the application(s) 116 comprise non-enterprise applications. For instance, the application(s) 116 may correspond to Microsoft Defender.

In some examples, the system comprises branch(es) 108 and/or site(s) 110. In some examples, the branch(es) 108 comprise one or more user(s), mobile device(s), and/or Internet of Things (IOT) device(s) located at one or more locations. In some examples, the branch(es) 108 communicate via edge device(s) 106. In some examples, the edge device(s) 106 comprise one or more routers, access point(s), or any other network device. In some examples, the edge device(s) 106 may comprise an ingress and/or egress router. In some examples, the network device(s) 104 may comprise a SDCI router and/or headend device. In some examples, the branch(es) 108 and/or site(s) 110 communicate with each other, the control plane 118, or cloud providers (e.g., SaaS, Internet, IaaS, etc.) via the network(s) 102 and/or a WAN 128. In some examples, the WAN 128 comprises an SDWAN.

In some examples, the edge device(s) 106 and/or network device(s) 104 may communicate information. For instance, the network device(s) 104 may send data packet(s) 112 associated with data flows to other network device(s) and/or edge device(s) 106. In some examples, the data packet(s) 112 and/or metadata associated with the data packet(s) 112 may be sent to and/or monitored by the control plane 118, such as by a data plane module.

In some examples, the control plane 118 may be configured to monitor the packets 112. In some examples, the packets may comprise data (e.g., which application is used, by which station, traffic characteristics and duration, etc.) associated with network traffic and may store the data as part of the system and/or control plane 118 (e.g., such as in a database and/or memory associated with the control plane 118).

In some examples, the control plane 118 may comprise one or more API's 120. In some examples, the API(s) 120 may correspond to non-enterprise network applications. For example, where the enterprise network corresponds to Cisco's network, the API(s) may corresponds to Microsoft API(s) that enable the system to receive telemetry data indicating threat(s) and/or vulnerabilities identified by a Microsoft Application associated with an endpoint device (e.g., such as from Microsoft's Defender), as well as access to other data (e.g., flow data, etc.).

In some examples, administrator device(s) 122 may send instructions 126 to one or more site(s) and/or branches via the control plane 118. In some examples, the instructions 126 may comprise moving an endpoint device and/or application to quarantine. In some examples, the instructions 126 may comprise moving one or more endpoint device(s) to staging mode (e.g., for an entire site, preventing traffic from accessing or leaving the site, instead of shutting down just the compromised endpoint device and/or application). In some examples, the system may notify an administrator of the enterprise network via the control plane. In some examples, the instructions 126 may comprise an authorization of an application on the endpoint device(s) to perform the remediation (e.g., by following AD or SGT Tag assignment). For instance, the system may receiving an indication via the control plane that the administrator of the enterprise network authorizes an endpoint device to perform action(s) to fix a compromised sit and/or endpoint device.

In some examples, the control plane 118 may receive information associated with a data packet and/or data flow. In some examples, the control plane 118 may receive telemetry data 114. In some examples, the control plane 118 may receive flow information associated with a site 110, branch 108, and/or endpoint device(s).

In some examples, the control plane 118 may be configured to communicate with administrator device(s) 122. As illustrated, the administrator device(s) 122 may comprise an application 124. In some examples, the application 124 may correspond to an enterprise application provided by a service provider (e.g., such as Cisco) that enables an administrator of the network 102 to access the control plane 118. For instance, the enterprise application 124 may correspond to Cisco's vSmart feature, Cisco's Network Hierarchy Manager, and/or Cisco's vManage feature.

At "1", the system may receive telemetry data. For instance, the telemetry data 114 may be associated with one or more user(s) of the enterprise network. As noted above, the telemetry data 114 may indicate non-compliance of the user(s) with one or more security posture(s) and/or firewall policies.

At "2", the system may identify impacted user(s). In some examples, the system may, via the API(s) 120, access a tenant portal associated with the application(s) 116 to access portal information associated with the enterprise user(s). For instance, the system may utilize a Microsoft API to login to a Microsoft tenant portal (e.g., using user credentials) in order to access portal information associated with user(s) corresponding to the telemetry data. The system may utilize the telemetry data and/or portal information to identify enterprise user(s) impacted by the security vulnerability and/or security threat indicated by the telemetry data.

At "3", the system may determine group(s) associated with the impacted user(s). In some examples, the system may correlate the telemetry data and/or the portal information with active user data stored in a database of the enterprise network in order to identify the group(s).

At "4", the system may identify a security policy. In some examples, the security policy may be based on a particular user identity and/or a user group associated with the user. In some examples, the security policy may define whether the endpoint device and/or application may need to be quarantined (e.g., move the user from a business VPN to a non-business VPN so that business flows are not affected). In some examples, the security policy may indicate that if all of the users within a group are affected, the group may be shut down (e.g., via staging mode) and/or quarantined. In some examples, the security policy may indicate that if whole site is affected, the system may shut down the whole site. In some examples, the system may identify signatures of data sent by affected users to see if there is a destination site that is affected and/or needs to be restricted and/or shut down.

At "5", the system may apply remedial action(s) to the group(s) and/or impacted user(s). In some examples, the remedial action(s) comprise quarantining (e.g., providing limited access to the user, isolating the user's VRF and/or moving the user to a quarantine VRF) the user and/or endpoint device. In this example, the system may perform a posture assessment (e.g., check Hotfix, AV, Pin lock USB device, unauthorized applications, malware, trojan, etc.) and may identify one or more remediation actions (e.g., WSUS, re-launching the application, launching and/or re-launching scripts, MDM, etc.) to perform to correct the security violation. In some examples, the remedial action(s) comprise moving one or more endpoint device(s) to staging mode (e.g., for an entire site, preventing traffic from accessing or leaving the site, instead of shutting down just the compromised endpoint device and/or application). In some examples, the system may notify an administrator of the enterprise network via the control plane.

In this way, the system may identify compromised endpoint(s), using data from a non-enterprise product, identify user(s), group(s), application(s) that are impacted, and take corrective action on an enterprise fabric. Accordingly, the techniques may integrate application services to streamline and improve security within the enterprise network.

Figure 2:
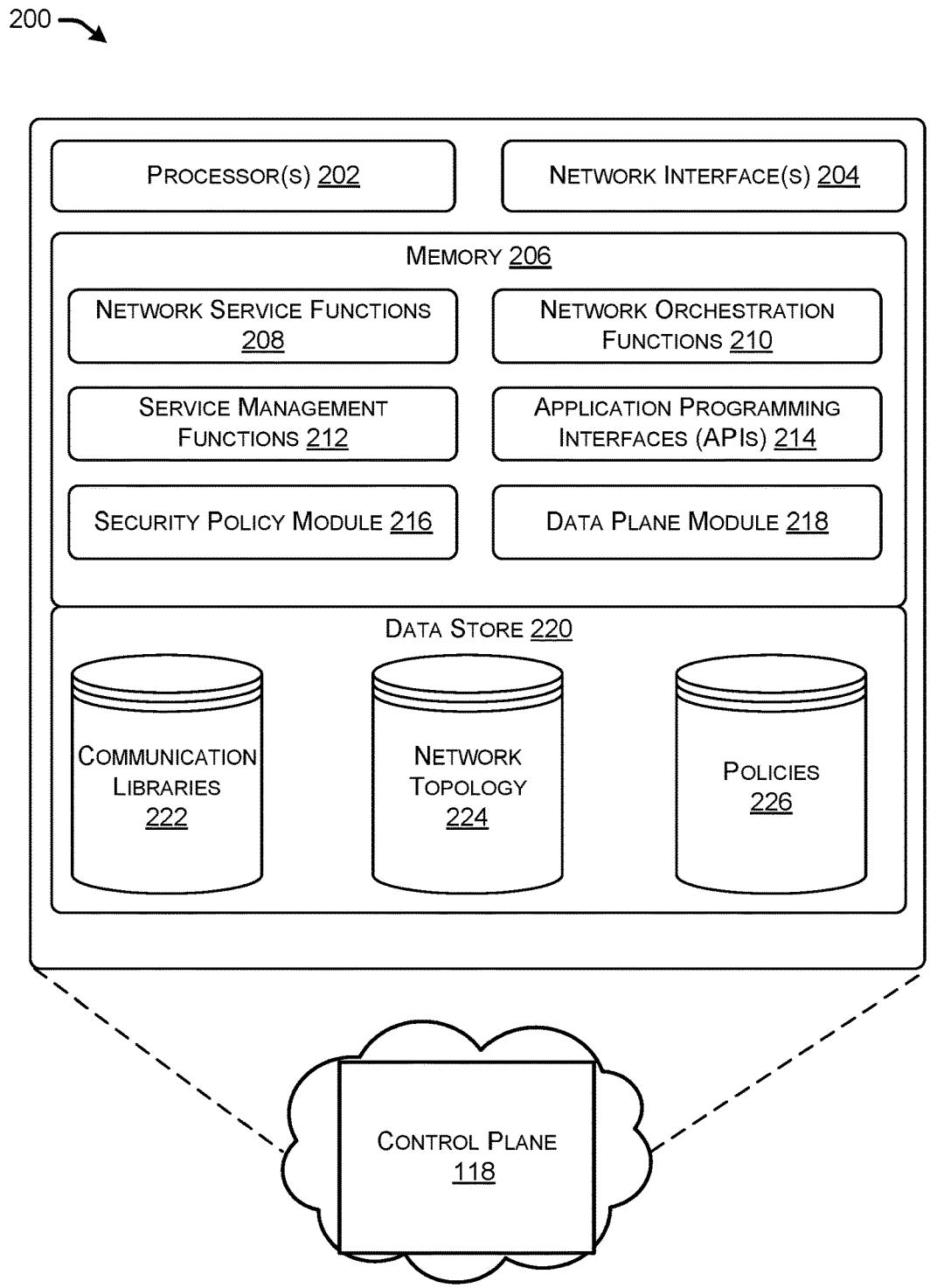
FIG. 2 illustrates a component diagram of an example control plane described in FIG. 1.

FIG. 2 illustrates a component diagram of an example monitoring system described in FIG. 1. In some instances, the control plane 118 may run on one or more computing devices in, or associated with, the network 102 (e.g., a single device or a system of devices). In some instances, the control plane 118 may be integrated as part of a cloud-based management solution (e.g., such as Cisco's Network Hierarchy Manager, Cisco's vSmart feature and/or Cisco's vManage feature).

Generally, the control plane 118 may include a programmable controller that manages some or all of the control plane activities of the network 102, and manages or monitors the network state using one or more centralized control models.

As illustrated, the control plane 118 may include, or run on, one or more hardware processors 202 (processors), one or more devices, configured to execute one or more stored instructions. The processor(s) 202 may comprise one or more cores. Further, the control plane 118 may include or be associated with (e.g., communicatively coupled to) one or more network interfaces 204 configured to provide communications with network device(s) 104, the edge device(s) 106 and other devices, and/or other systems or devices in the network 102 and/or remote from the network 102. The network interfaces 204 may include devices configured to couple to personal area networks (PANs), wired and wireless local area networks (LANs), wired and wireless wide area networks (WANs), SDCI's, and so forth. For example, the network interfaces 204 may include devices compatible with any networking protocol.

The control plane 118 may also include memory 206, such as computer-readable media, that stores various executable components (e.g., software-based components, firmware-based components, etc.). The memory 206 may generally store components to implement functionality described herein as being performed by the control plane 118. The memory 206 may store one or more network service functions 208, such as a slicing manager, a topology manager to manage a topology of the network 102, a host tracker to track what network components are hosting which programs or software, a switch manager to manage switches of the network 102, a process manager, and/or any other type of function performed by the control plane 118.

The control plane 118 may further include network orchestration functions 210 stored in memory 206 that perform various network functions, such as resource management, creating and managing network overlays, programmable APIs, provisioning or deploying applications, software, or code to hosts, and/or perform any other orchestration functions. Further, the memory 206 may store one or more service management functions 212 configured to manage the specific services of the network 102 (configurable), and one or more APIs 214 for communicating with devices in the network 102 and causing various control plane functions to occur.

Further, the control plane 118 may include a security policy module 216. In some examples, the security policy module may comprise firewall policies that may be written using security group tags (SGTs) and user-groups as source filters. In some examples, the system may leverage this to provide a dynamic security policy when integrated with data from a non-enterprise application (e.g., such as Microsoft Defender) about user compliance and behavior. In some examples, a firewall policy may create user-groups based on SGTs called non-compliant-users and compromised-endpoints. An example firewall policy may include:

| Source | Destination | Action |
|---|---|---|
| Compromised-endpoints | Any | Drop |
| Non-compliant-users | Secure-servers, SaaS applications | Drop |
| Any | SaaS applications, Secure-servers | Inspect |

In some examples, the security policy module may be configured to determine when a user of an endpoint device takes an action that is non-compliant with a security policy and/or firewall policy. For example, the system may identify when a user's device is identified to be non-compliant with an organization's security posture (e.g., such as a Firewall is not enabled on the laptop). In this example, the system may notify the control plane. In some examples, the system can add the user, user device, application, etc. to a user-group or a pre-configured SGT which identifies the user as non-compliant. This user-IP or SGT-IP mapping may then be propagated to the branch router (via existing ISE integration from the control plane). In some examples, such as wherein the policy is already available on the site and/or branch router, the action for the non-compliant user will be automatically enforced when the next session is initiated from this user (e.g., traffic to known secure servers will be dropped and some SaaS applications can't be accessed by this user).

In some examples, the security policy module may be configured to identify when a user of an endpoint device takes an action that compromises the endpoint device. For example, a user may upload a file that is identified by the API and/or application(s) as malicious. In this example, the application and/or API (e.g., such as Microsoft Defender for Office365 (say user emails this file using Outlook or uploads it to Onedrive) may automatically block the file. Alternatively, the system may retrospectively identity that a file uploaded by a user is infected with a malware. In this example, the control plane (e.g., via Cisco's vManage and/or Cisco's vSmart) may be notified. In this example, the system may add the user to a pre-configured group (e.g. of compromised-endpoints) for which a drop-all firewall policy has already been configured on the branch router. In this example, the User-IP/SGT-IP mapping may be pushed to the branch router, which will trigger the enforcement of the policy to drop all traffic from the compromised device. Further, the system may notify the administrator of the network, via the control plane and may enable the administrator to initiate decommissioning the device or a sanitization and re-onboarding of the device.

In some examples, the security policy module 216 may be configured to handle dynamic firewall rules on detection of threats and/or network vulnerabilities. For instance, where a remote server holds sensitive information or services a few critical applications, the server may need a high level of fine-grained access control and a way for a non-compliant user to not be allowed to access information. In this example, the system may either insert a new firewall rule for this remote server, such as:

| Source | Destination | Action |
|---|---|---|
| Compromised-endpoints | Any | Drop |
| Non-compliant-users | Server-with-sensitive-info | Drop |
| Non-compliant-users | Secure-servers, SaaS applications | Drop |
| Any | SaaS applications, Secure-servers | Inspect |

The control plane 118 may include a data plane module 218. In some examples, the data plane module 218 is configured to handle data packets and data packet flow. In some examples, the data plane module may be configured to track applications and/or application flows, users, and/or AAR via WAN to identify locations affected and/or compromised in overlay fabrics. In some examples, the control plane module may be configured to integrate security information and event management (STEM) and extended detection and response (XDR) to enterprises infrastructure.

The control plane 118 may further include a data store 220, such as long-term storage, that stores communication libraries 222 for the different communication protocols that the control plane 118 is configured to use or perform. Additionally, the data store 220 may include network topology data 224, such as a model representing the layout of the network components in the network 102 and/or data indicating available bandwidth, available CPU, delay between nodes, computing capacity, processor architecture, processor type(s), etc. The data store 220 may store policies 226 that includes security data associated with the network, security policies configured for the network, firewall policies, firewall configuration data, security posture data, and/or compliance policies configured for the network.

FIG. 3 illustrates an example user interface 300 that may be presented by the system described in FIGS. 1 and 2. In some examples, the user interface 300 may be presented to an administrator of the network via the enterprise application 124.

As illustrated, the user interface 300 may comprise visual representation(s) of information included in the telemetry data 114 received by the control plane 118 described above. For instance, the user interface 300 may include an indication of a site within the enterprise network and a system IP associated with the site (illustrated at "Site 100-100.1.1.1"). The user interface may include indication(s) associated with particular endpoint device(s) at a site. For instance, as illustrated, the user interface 300 may indicate operating system(s) associated with a first user and a second user (illustrated at "OS1" and "OS2"). In some examples, "OS1" may correspond to a same operating system as "OS2". In some examples, OS1 may be a different operating system than OS2. The user interface 300 may include IP address(es) associated with each user and/or endpoint device (illustrated as "100.1.1.2" and "100.1.1.15").

As illustrated in FIG. 3, the user interface may include visual representations of security checks associated with the telemetry data. For instance, as noted above, the telemetry data may comprise indications of compliance with security posture(s) and/or firewall(s) including firewall installation checks, application inventory, hardware inventory, process checks, dictionary conditions, application checks, file checks, service checks, disk encryption, an anti-malware status, anti-spyware status, anti-virus status, application health data, non-corporate application data, patch management data, registry updates data, service updates data, USB insertion data, WSUS remediation data, remediation data, etc.

As illustrated, where an endpoint device has passed the one or more check(s), the user interface may display a visual indication of the device passing (illustrated as a "check"). Where the endpoint device has failed a check, the user interface 300 may display a visual representation of the endpoint device failing (illustrated as an "X"). For instance, in the illustrated example, the first endpoint device having the IP address of 100.1.1.2 is illustrated as failing a hardware inventory check. Additionally, the second endpoint device, having the IP address of 100.1.1.15 is illustrated as failing the firewall installation checks, dictionary conditions, and USB checks.

As illustrated, the user interface 300 may include indications of remediation action(s) associated with the endpoint device. For instance, the first endpoint device (e.g., OS1) may be configured to have an automatic remediation or a manual remediation. As illustrated the second endpoint device (OS2) may be configured to have a partial remediation.

Figure 4:
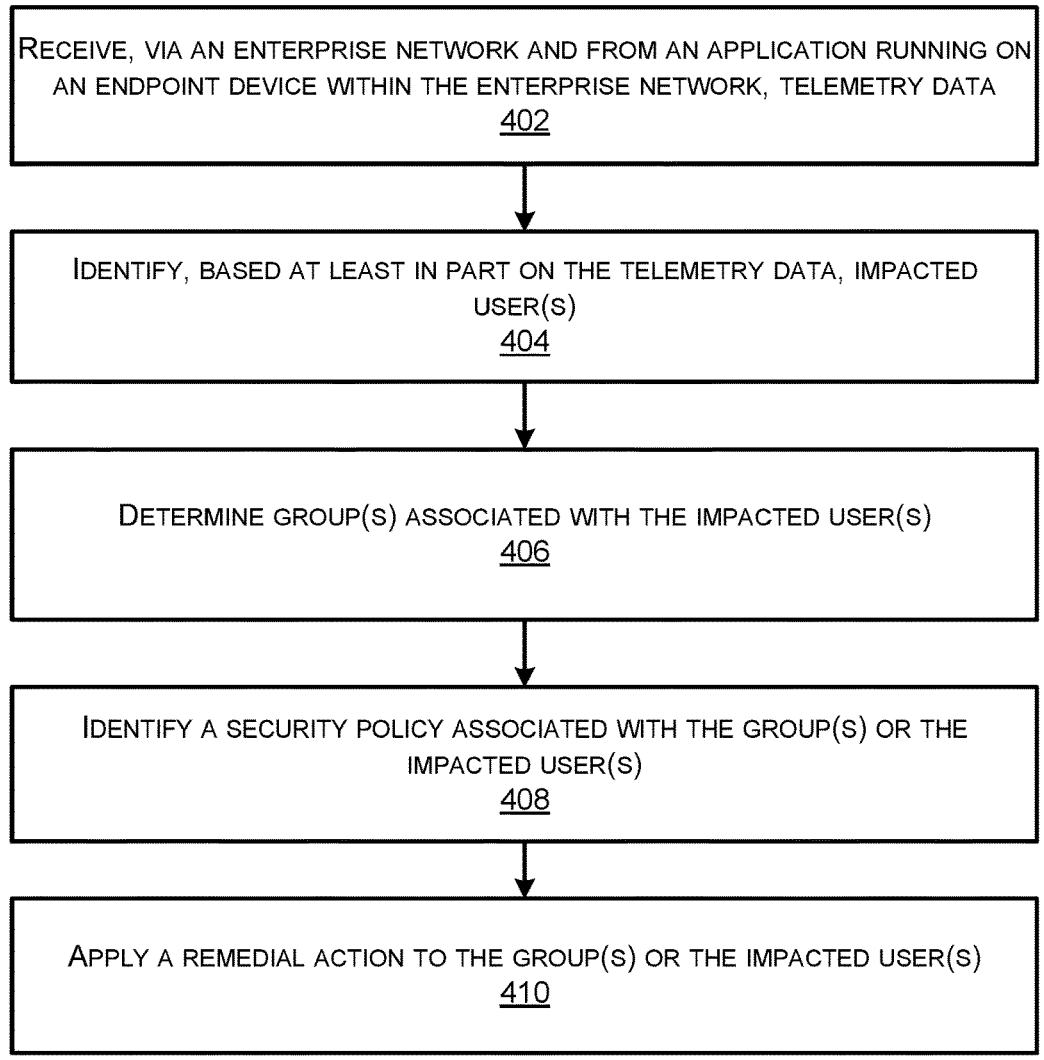
FIG. 4 illustrates a flow diagram of an example method for utilizing telemetry data from non-enterprise providers to remediate compromised site(s) and/or user(s) in a network associated with the system described in FIGS. 1-3.

FIG. 4 illustrates a flow diagram of an example system 400 for utilizing telemetry data from non-enterprise providers to remediate compromised site(s) and/or user(s) in a network associated with the system. In some instances, the steps of system 400 may be performed by one or more devices (e.g., control plane 118, network device(s) 104, etc.) that include one or more processors and one or more non-transitory computer-readable media storing computer-executable instructions that, when executed by the one or more processors, cause the one or more processors to perform operations of system 400.

At 402, the system may receive, via an enterprise network and from an application running on an endpoint device within the enterprise network, telemetry data. In some examples, the telemetry data may indicate non-compliance with one or more security postures within the enterprise network. In some examples, the telemetry data may comprise a security score associated with a level of non-compliance of the endpoint device.

At 404, the system may identify, based at least in part on the telemetry data, impacted user(s). In some examples, the system may access, based at least in part on the telemetry data, data associated with a plurality of users of the enterprise network. The system may identify the one or more impacted users based at least in part on the data. For instance, as described above, the system may access additional data using a tenant portal of the non-enterprise application and the API(s).

In some examples, the system may, via the API(s) 120, access a tenant portal associated with the application(s) 116 to access portal information associated with the enterprise user(s). For instance, the system may utilize a Microsoft API to login to a Microsoft tenant portal (e.g., using user credentials) in order to access portal information associated with user(s) corresponding to the telemetry data. The system may utilize the telemetry data and/or portal information to identify enterprise user(s) impacted by the security vulnerability and/or security threat indicated by the telemetry data.

At 406, the system may determine group(s) associated with the one or more impacted users. As described above, system may correlate the telemetry data and/or the portal information with active user data stored in a database of the enterprise network in order to identify the group(s).

At 408, the system may identify a security policy associated with the group(s) or impacted user(s). In some examples, the security policy defines the remedial action associated with a particular user of the one or more impacted users or a particular group of the one or more groups. In some examples, the security policy may be based on a particular user identity and/or a user group associated with the user. In some examples, the security policy may define whether the endpoint device and/or application may need to be quarantined (e.g., move the user from a business VPN to a non-business VPN so that business flows are not affected). In some examples, the security policy may indicate that if all of the users within a group are affected, the group may be shut down (e.g., via staging mode) and/or quarantined. In some examples, the security policy may indicate that if whole site is affected, the system may shut down the whole site. In some examples, the system may identify signatures of data sent by affected users to see if there is a destination site that is affected and/or needs to be restricted and/or shut down.

At 410, the system may apply a remedial action to the group(s) or the impacted user(s). In some examples, the remedial action comprises quarantining a user of the one or more impacted users, shutting down one or more user devices of the one or more impacted users, or shutting down one or devices associated with the one or more groups. In some examples, applying the remedial action comprises sending instructions to the one or more groups or the one or more impacted users, wherein the instructions cause the application to access a local firewall to enforce the security policy.

In some examples, the remedial action(s) comprise quarantining (e.g., providing limited access to the user, isolating the user's VRF and/or moving the user to a quarantine VRF) the user and/or endpoint device. In this example, the system may perform a posture assessment (e.g., check Hotfix, AV, Pin lock USB device, unauthorized applications, malware, trojan, etc.) and may identify one or more remediation actions (e.g., WSUS, re-launching the application, launching and/or re-launching scripts, MDM, etc.) to perform to correct the security violation. In some examples, the remedial action(s) comprise moving one or more endpoint device(s) to staging mode (e.g., for an entire site, preventing traffic from accessing or leaving the site, instead of shutting down just the compromised endpoint device and/or application). In some examples, the system may notify an administrator of the enterprise network via the control plane.

Figure 5:
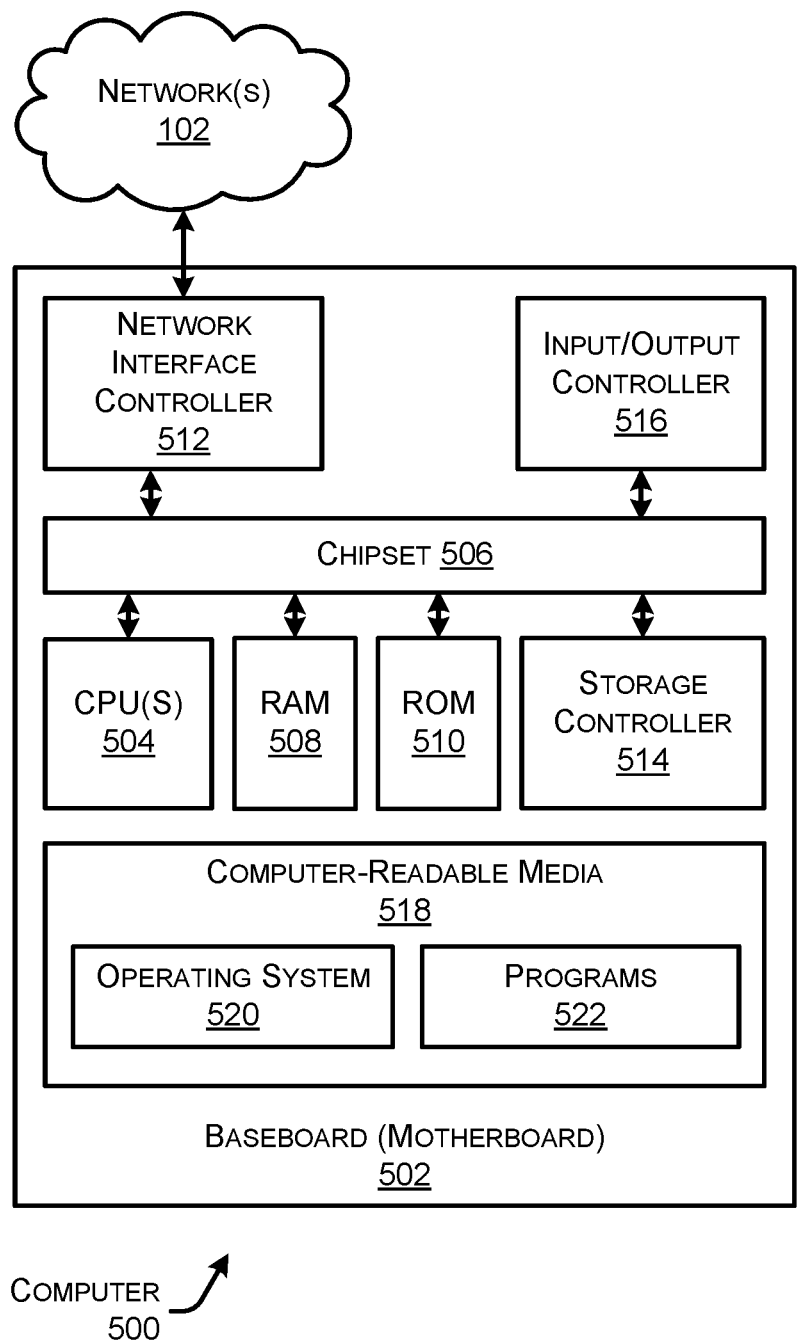
FIG. 5. is a computer architecture diagram showing an illustrative computer hardware architecture for implementing a device that can be utilized to implement aspects of the various technologies presented herein.

FIG. 5 shows an example computer architecture for a device capable of executing program components for implementing the functionality described above. The computer architecture shown in FIG. 5 illustrates any type of computer 500, such as a conventional server computer, workstation, desktop computer, laptop, tablet, network appliance, e-reader, smartphone, or other computing device, and can be utilized to execute any of the software components presented herein. The computer may, in some examples, correspond to a control plane 118 and/or any other device described herein, and may comprise personal devices (e.g., smartphones, tables, wearable devices, laptop devices, etc.) networked devices such as servers, switches, routers, hubs, bridges, gateways, modems, repeaters, access points, and/or any other type of computing device that may be running any type of software and/or virtualization technology.

The computer 500 includes a baseboard 502, or "motherboard," which is a printed circuit board to which a multitude of components or devices can be connected by way of a system bus or other electrical communication paths. In one illustrative configuration, one or more central processing units ("CPUs") 504 operate in conjunction with a chipset 506. The CPUs 504 can be standard programmable processors that perform arithmetic and logical operations necessary for the operation of the computer 500.

The CPUs 504 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 506 provides an interface between the CPUs 504 and the remainder of the components and devices on the baseboard 502. The chipset 506 can provide an interface to a RAM 508, used as the main memory in the computer 500. The chipset 506 can further provide an interface to a computer-readable storage medium such as a read-only memory ("ROM") 510 or non-volatile RAM ("NVRAM") for storing basic routines that help to startup the computer 500 and to transfer information between the various components and devices. The ROM 510 or NVRAM can also store other software components necessary for the operation of the computer 500 in accordance with the configurations described herein.

The computer 500 can operate in a networked environment using logical connections to remote computing devices and computer systems through a network, such as network 102. The chipset 506 can include functionality for providing network connectivity through a NIC 512, such as a gigabit Ethernet adapter. The NIC 512 is capable of connecting the computer 500 to other computing devices over the network 102. It should be appreciated that multiple NICs 512 can be present in the computer 500, connecting the computer to other types of networks and remote computer systems.

The computer 500 can be connected to a storage device 518 that provides non-volatile storage for the computer. The storage device 518 can store an operating system 520, programs 522, and data, which have been described in greater detail herein. The storage device 518 can be connected to the computer 500 through a storage controller 514 connected to the chipset 506. The storage device 518 can consist of one or more physical storage units. The storage controller 514 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The computer 500 can store data on the storage device 518 by transforming the physical state of the physical storage units to reflect the information being stored. The specific transformation of physical state can depend on various factors, in different embodiments of this description. Examples of such factors can include, but are not limited to, the technology used to implement the physical storage units, whether the storage device 518 is characterized as primary or secondary storage, and the like.

For example, the computer 500 can store information to the storage device 518 by issuing instructions through the storage controller 514 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 500 can further read information from the storage device 518 by detecting the physical states or characteristics of one or more particular locations within the physical storage units.

In addition to the mass storage device 518 described above, the computer 500 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 500. In some examples, the operations performed by the control plane 118 and/or any components included therein, may be supported by one or more devices similar to computer 500. Stated otherwise, some or all of the operations performed by the control plane 118 and/or any components included therein, may be performed by one or more computer devices 500.

By way of example, and not limitation, computer-readable storage media can include volatile and non-volatile, removable and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage device 518 can store an operating system 520 utilized to control the operation of the computer 500. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage device 518 can store other system or application programs and data utilized by the computer 500.

In one embodiment, the storage device 518 or other computer-readable storage media is encoded with computer-executable instructions which, when loaded into the computer 500, transform the computer from a general-purpose computing system into a special-purpose computer capable of implementing the embodiments described herein. These computer-executable instructions transform the computer 500 by specifying how the CPUs 504 transition between states, as described above. According to one embodiment, the computer 500 has access to computer-readable storage media storing computer-executable instructions which, when executed by the computer 500, perform the various processes described above with regard to FIGS. 1-4. The computer 500 can also include computer-readable storage media having instructions stored thereupon for performing any of the other computer-implemented operations described herein.

The computer 500 can also include one or more input/output controllers 516 for receiving and processing input from a number of input devices, such as a keyboard, a mouse, a touchpad, a touch screen, an electronic stylus, or other type of input device. Similarly, an input/output controller 516 can provide output to a display, such as a computer monitor, a flat-panel display, a digital projector, a printer, or other type of output device. It will be appreciated that the computer 500 might not include all of the components shown in FIG. 5, can include other components that are not explicitly shown in FIG. 5, or might utilize an architecture completely different than that shown in FIG. 5.

As described herein, the computer 500 may comprise one or more of a control plane 118 and/or any other device. The computer 500 may include one or more hardware processors 504 (processors) configured to execute one or more stored instructions. The processor(s) 504 may comprise one or more cores. Further, the computer 500 may include one or more network interfaces configured to provide communications between the computer 500 and other devices, such as the communications described herein as being performed by the control plane 118 and/or any other device. The network interfaces may include devices configured to couple to personal area networks (PANs), wired and wireless local area networks (LANs), wired and wireless wide area networks (WANs), and so forth. For example, the network interfaces may include devices compatible with Ethernet, Wi-Fi™, and so forth.

The programs 522 may comprise any type of programs or processes to perform the techniques described in this disclosure. For instance, the programs 522 may cause the computer 500 to perform techniques including receiving, via an enterprise network and from an application running on an endpoint device within the enterprise network, telemetry data; identifying, based at least in part on the telemetry data, one or more impacted users; determining, based at least in part on the identifying, one or more groups associated with the one or more impacted users; identifying a security policy associated with the one or more groups or one or more impacted users; and applying a remedial action to the one or more groups or the one or more impacted users.

In this way, the computer 500 can identify compromised endpoint(s), using data from a non-enterprise product, identify user(s), group(s), application(s) that are impacted, and take corrective action on an enterprise fabric. Accordingly, the techniques may integrate application services to streamline and improve security within the enterprise network.

While the invention is described with respect to the specific examples, it is to be understood that the scope of the invention is not limited to these specific examples. Since other modifications and changes varied to fit particular operating requirements and environments will be apparent to those skilled in the art, the invention is not considered limited to the example chosen for purposes of disclosure, and covers all changes and modifications which do not constitute departures from the true spirit and scope of this invention.

Although the application describes embodiments having specific structural features and/or methodological acts, it is to be understood that the claims are not necessarily limited to the specific features or acts described. Rather, the specific features and acts are merely illustrative some embodiments that fall within the scope of the claims of the application.

What is claimed is:

1. A method implemented by a control plane system that manages a software-defined wide area network (SD-WAN), comprising:
    receiving, at the control plane system and from a non-enterprise application running on an endpoint device within an enterprise network connected to the SD-WAN, telemetry data comprising indications of non-compliance of a user or an application associated with the endpoint device with one or more security postures within the enterprise network;
    assigning, based at least in part on the telemetry data, the user or the application to a security group including other users or applications impacted by a security vulnerability associated with the non-compliance of the one or more security postures;
    providing an SD-WAN device of the SD-WAN with an indication of the security group to which the user or the application belong;
    identifying, at the SD-WAN device, a security policy of the enterprise network associated with the security group; and
    in response to identifying the security policy, applying a remedial action indicated by the security policy to the user or the application.

2. The method of claim 1, further comprising creating the security group, wherein the user is assigned to the security group based on behavior data indicating whether the user complies with a security posture or a firewall policy.

3. The method of claim 1, wherein the telemetry data further comprises a security score associated with a level of the non-compliance of the endpoint device.

4. The method of claim 1, wherein the remedial action comprises quarantining the user or the application, shutting down one or more user devices of the user or the application, or shutting down one or more devices associated with the user or the application.

5. The method of claim 1, wherein the security policy defines the remedial action associated with the security group, the security group corresponding to a site within the enterprise network.

6. The method of claim 1, further comprising:
    accessing, based at least in part on the telemetry data and via a portal of the enterprise network, user data associated with a plurality of users of the enterprise network; and
    identifying the user based at least in part on the user data.

7. The method of claim 1, wherein applying the remedial action comprises sending instructions that cause the non-enterprise application to access a local firewall to enforce the security policy.

8. A system comprising:
    one or more processors; and
    one or more non-transitory computer-readable media storing computer-executable instructions that, when executed by the one or more processors, cause the one or more processors to perform operations comprising:
        receiving, at a control plane system and from an application running on an endpoint device within an enterprise network connected to a software-defined wide area network (SD-WAN), telemetry data comprising indications of non-compliance of a user or an application associated with the endpoint device with one or more security postures within the enterprise network;
        assigning, based at least in part on the telemetry data, the user or the application to a security group including other users or applications of the enterprise network that are impacted by a security vulnerability associated with the non-compliance of the one or more security postures;
        providing an SD-WAN device of the SD-WAN with an indication of the security group to which the user or the application belong;
        identifying, at the SD-WAN device, a security policy of the enterprise network associated with the security group; and
        applying, in response to identifying the security policy, a remedial action indicated by the security policy to the user or the application.

9. The system of claim 8, the operations further comprising:
- determining that the user of the endpoint device performs an action that violates the security policy or compromises the endpoint device;
- receiving the telemetry data in response to determining the user has performed the action;
- adding the user to the security group, the security group being associated with non-compliant users of the enterprise network and comprising a pre-configured security policy;
- applying, based on the pre-configured security policy, the remedial action; and
- sending, to a device of an administrator of the enterprise network, a notification of the remedial action.

10. The system of claim 8, wherein the telemetry data comprises a security score associated with a level of the non-compliance of the endpoint device, and wherein the remedial action is applied based on the security score being above a threshold score.

11. The system of claim 8, wherein the remedial action comprises quarantining the user, shutting down one or more user devices of the user, or shutting down one or more devices associated with the security group.

12. The system of claim 8, wherein the security policy defines the remedial action associated with a particular user or a particular group.

13. The system of claim 8, further comprising:
- accessing, based at least in part on the telemetry data and via a portal of the enterprise network, user data associated with a plurality of users of the enterprise network; and
- identifying the user based at least in part on behavior data associated with the user indicating non-compliant behavior.

14. The system of claim 8, wherein applying the remedial action comprises sending instructions that cause the application to access a local firewall to enforce the security policy.

15. One or more non-transitory computer-readable media storing computer-readable instructions that, when executed by one or more processors, cause the one or more processors to perform operations comprising:
- receiving, at a control plane system and from an application running on an endpoint device within an enterprise network connected to a software-defined wide area network (SD-WAN), telemetry data comprising indications of non-compliance of a user or an application associated with the endpoint device with one or more security postures within the enterprise network;
- assigning, based at least in part on the telemetry data, the user or the application to a security group including other users or applications that are impacted by a security vulnerability associated with the non-compliance of the one or more security postures;
- identifying a security policy of the enterprise network associated with the security group; and
- in response to identifying the security policy, applying a remedial action indicated by the security policy to the user or the application.

16. The one or more non-transitory computer-readable media of claim 15, wherein the operations further comprise:
- determining that a second user of a second endpoint device performs an action that violates the security policy or compromises the second endpoint device;
- receiving, in response to the user performing the remedial action, second telemetry data comprising second indications of non-compliance;
- adding the second user to the security group, the security group being associated with non-compliant users of the enterprise network and comprising a pre-configured security policy;
- applying, in response to adding the second user to the security group and based on the pre-configured security policy, a second remedial action to the second endpoint device; and
- sending, to a device of an administrator of the enterprise network, a notification of the second remedial action.

17. The one or more non-transitory computer-readable media of claim 15, wherein the telemetry data further comprises a security score associated with a level of the non-compliance of the endpoint device.

18. The one or more non-transitory computer-readable media of claim 15, wherein the remedial action comprises quarantining the user or the application, shutting down one or more user devices of the user or the application, or shutting down one or more devices associated with the user or the application.

19. The one or more non-transitory computer-readable media of claim 15, wherein the security policy defines the remedial action associated with members of the security group.

20. The one or more non-transitory computer-readable media of claim 15, the operations further comprising:
- accessing, based at least in part on the telemetry data and via a portal of the enterprise network, user data associated with a plurality of users of the enterprise network; and
- identifying the user based at least in part on the user data.

* * * * *